US009404187B2

(12) United States Patent
Flores Ramirez et al.

(10) Patent No.: US 9,404,187 B2
(45) Date of Patent: Aug. 2, 2016

(54) COATED STEEL SUBSTRATE AND METHOD FOR MAKING THE SAME

(75) Inventors: Jose Reyes Flores Ramirez, Amsterdam (NL); Magali Audrey Valeria Wainer, Haarlem (NL); Fouzia Hannour, Haarlem (NL)

(73) Assignee: TATA STEEL NEDERLAND TECHNOLOGY B.V., Ijmuiden (NL)

( * ) Notice: Subject to any disclaimer, the term of this patent is extended or adjusted under 35 U.S.C. 154(b) by 0 days.

(21) Appl. No.: 14/130,917

(22) PCT Filed: Jul. 6, 2012

(86) PCT No.: PCT/EP2012/002850
§ 371 (c)(1),
(2), (4) Date: Jan. 7, 2014

(87) PCT Pub. No.: WO2013/004393
PCT Pub. Date: Jan. 10, 2013

(65) Prior Publication Data
US 2014/0141275 A1 May 22, 2014

(30) Foreign Application Priority Data
Jul. 7, 2011 (EP) .................................. 11005545

(51) Int. Cl.
*C23C 28/04* (2006.01)
*C09D 5/08* (2006.01)
*C23C 2/26* (2006.01)

(52) U.S. Cl.
CPC ............... *C23C 28/042* (2013.01); *C09D 5/08* (2013.01); *C23C 2/26* (2013.01); *Y10T 428/12549* (2015.01); *Y10T 428/25* (2015.01); *Y10T 428/265* (2015.01); *Y10T 428/31663* (2015.04); *Y10T 428/31678* (2015.04)

(58) Field of Classification Search
None
See application file for complete search history.

(56) References Cited

U.S. PATENT DOCUMENTS

| 4,129,539 A | 12/1978 | Fakla et al. |
| 4,330,598 A | 5/1982 | Lee et al. |
| 4,508,692 A | 4/1985 | Savage et al. |
| 4,695,516 A | 9/1987 | Masuhara et al. |
| 5,160,791 A | 11/1992 | Tannenbaum |
| 5,750,223 A | 5/1998 | Tada et al. |
| 5,985,454 A * | 11/1999 | McMordie et al. ........... 428/413 |
| 6,403,213 B1 | 6/2002 | Huesmann |
| 6,479,581 B1 | 11/2002 | Ireland et al. |
| 2004/0137378 A1 | 7/2004 | Sugeta et al. |
| 2005/0048218 A1 | 3/2005 | Weidman |
| 2006/0151106 A1 | 7/2006 | Hiraishi et al. |
| 2006/0188300 A1 * | 8/2006 | Matsunaka et al. ........... 399/333 |
| 2007/0141246 A1 | 6/2007 | Le Craz |
| 2007/0225178 A1 | 9/2007 | Sawyer et al. |
| 2007/0248910 A1 * | 10/2007 | Kimura et al. ............. 430/270.1 |
| 2008/0083444 A1 * | 4/2008 | Beretich ....................... 136/200 |
| 2008/0127819 A1 | 6/2008 | Maier |
| 2010/0209593 A1 | 8/2010 | Banerjee et al. |
| 2014/0034651 A1 | 2/2014 | Durand et al. |
| 2014/0150247 A1 | 6/2014 | Flores Ramirez et al. |

FOREIGN PATENT DOCUMENTS

| EP | 0758674 A1 | 2/1997 |
| GB | 1512495 A | 6/1978 |
| WO | 00/53677 A1 | 9/2000 |
| WO | 00/69984 A1 | 11/2000 |
| WO | 2005/059196 A2 | 6/2005 |
| WO | 2012072953 A1 | 6/2012 |

OTHER PUBLICATIONS

International Search Report dated Oct. 2, 2012 from International Application PCT/EP2012/002851 to Tata Steel Nederland Technology B.V. filed Jul. 6, 2012.
3rd Party Observation of Jun. 18, 2014 against European Patent Application No. 12735786.1 to Tata Steel Nederland Technology B.V. filed on Jul. 6, 2012.
Dec. 21, 2015, Office Action for U.S. Appl. No. 14/130,915, Jose Reyes Flores Ramirez et al. filed Jan. 4, 2014.

* cited by examiner

*Primary Examiner* — Vera Katz
(74) *Attorney, Agent, or Firm* — Vorys, Sater, Seymour and Pease LLP

(57) ABSTRACT

Steel substrate suitable for forming operations including a corrosion protective coating, wherein the corrosion protective coating includes a nano-layer of oxide nanoparticles and a polyamide-imide layer on the nano-layer.

24 Claims, 1 Drawing Sheet

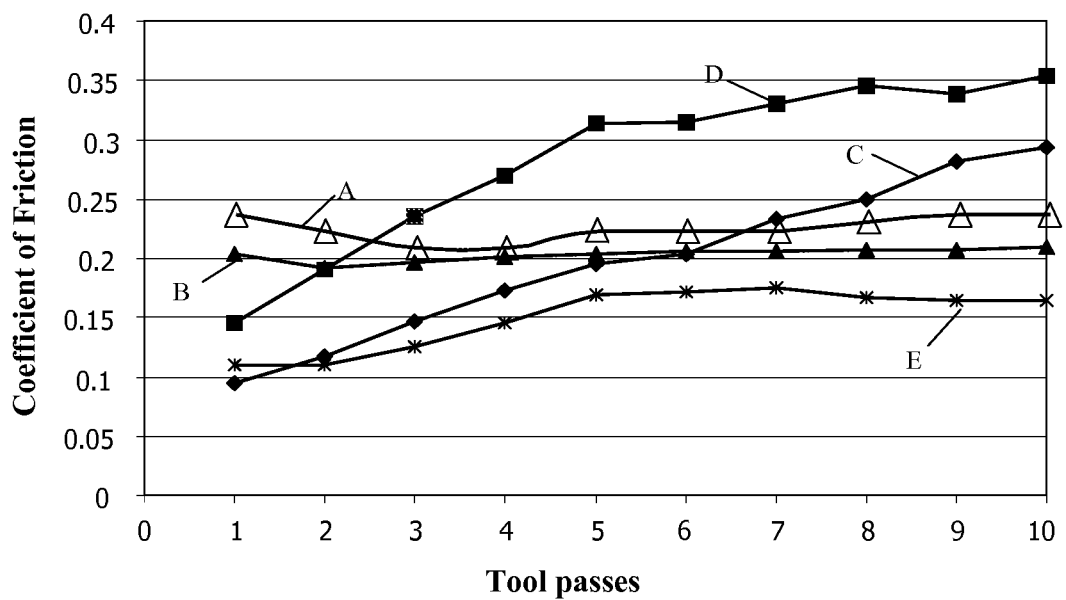

US 9,404,187 B2

COATED STEEL SUBSTRATE AND METHOD FOR MAKING THE SAME

CROSS-REFERENCE TO RELATED APPLICATIONS

This is a §371 US National Stage Application of International Application No. PCT/EP2012/002850 filed on 6 Jul. 2012, claiming the priority of European Patent Application No. 11005545.6 filed on 7 Jul. 2011.

FIELD OF THE INVENTION

The present invention relates to a steel substrate comprising a corrosion protective coating and a method for making the same. The present invention further relates to the use of the steel substrate in forming operations to form a part.

BACKGROUND OF THE INVENTION

Galvanized steel is used in applications where rust resistance is needed, for instance, in the automotive industry where the zinc layer reduces the onset of rust at exposed edges and surfaces. Additional coating layers are provided to make the galvanised steel substrate more aesthetically pleasing and to further protect the steel substrate from corrosion. In this respect galvanised steel substrates are first provided with a phosphate coating (2-5 μm) to enhance paint adhesion, by enhancing paint adhesion such phosphate coatings indirectly enhance corrosion resistance.

The application of the phosphate coating comprises the steps of dissolving iron, zinc or manganese phosphate salts in a solution of phosphoric acid and immersing the steel substrate in the solution for 4-6 minutes. However, before the phosphate coating can be applied, the automotive manufacturer needs to clean the galvanised steel substrate, such that it is free from oil, grease, lubricants and rust. Cleaning the substrate and providing the phosphate layer is not trivial and increases manufacturing costs. The use of phosphoric acid also introduces environmental and safety issues related to the handling and disposal of such solutions.

Organic coatings are often provided on the phosphate coating by electrophoretic deposition, which is a process that uses electrical current to deposit paint onto a suitable substrate. The electro-(organic)-coating typically has a thickness between 7 and 20 μm and acts as a primer for the application of additional paint layers. The use of electrophoretic deposition to apply organic coatings increases the cost of manufacturing automotive parts due to the high voltages that are required to apply such coatings.

It is an object of the present invention to provide a coated steel substrate having improved corrosion resistance, adhesion properties and lubrication properties.

It is a further object of the invention to provide a coated steel substrate having a reduced coating thickness.

It is another object of the invention to provide a process for manufacturing a coated steel substrate in which the steps of providing a phosphate coating and an electro-coating are avoided.

DESCRIPTION OF THE INVENTION

The first aspect of the invention relates to a steel substrate suitable for forming operations comprising a corrosion protective coating wherein the corrosion protective coating comprises a nano-layer of oxide nanoparticles and a polyamide-imide layer on the nano-layer.

The inventors found that by providing the corrosion protective coating on the steel substrate the combination of the nano-layer comprising oxide nanoparticles and the polyamide-imide (PAI) layer is effective in preventing corrosion of the underlying steel substrate (strip, sheet or blank). Moreover, effective corrosion protection is possible even when the nano-layer and the PAI layer have a combined dry film thickness between 1 and 3 μm. The nano-layer provides active corrosion protection to reduce the effects of corrosion caused by surface defects, scratches and/or cut edges. In this respect the presence of the nano-layer reduces the formation of white rust when provided on zinc or zinc alloy coated steel and reduces the formation of red rust if provided on cold-rolled steel. At the same time the low water absorbance and high thermal stability of PAI limits corrosion propagation on exposed areas such as cut edges.

In a preferred embodiment of the invention the polyamide-imide layer comprises a hydroxyl amine. Suitable hydroxyl amines include diethylaminoethanol, diisopropanolamine and aminoethylpropanediol. Tertiary hydroxyl amines are preferred although the presence of primary or secondary hydroxyl amines in the curable coating also improves the corrosion resistance properties of the layer of polyamide-imide. The inventors found that hydroxyl amines having a boiling point of at least 160° C. and preferably above 240° C. further improved the corrosion protective properties of the layer of polyamideimide. Tertiary hydroxyl amines such as 2,2-Butyliminodiethanol are particularly preferred.

In a preferred embodiment of the invention the polyamide-imide layer has a coating thickness between 1 and 10 μm, preferably between 3 and 5 μm. The inventors found that even at reduced layer thicknesses, the PAI layer provides improved corrosion resistance and lubrication properties relative to coating systems that comprise phosphate coatings (3-5 μm) and/or electro-coatings (7-20 μm). Improvements in corrosion resistance are possible even when anti-corrosion pigments, metallic particles and corrosion inhibitors are absent from the PAI layer. The PAI layer has a thermal stability between −60° C. and 400° C. at atmospheric pressure and exhibits excellent adhesion to the nano-layer.

In a preferred embodiment of the invention the nano-layer has a dry film thickness between 10 and 500 nm, preferably between, 10 and 100 nm and more preferably between 10 and 20 nm. The nano-layer itself comprises a self assembled monolayer (SAM) of oxide nano-particles. Therefore the thickness of the nano-layer can be considered to be proportional to the diameter of the oxide-nanoparticles that are used. Nano-layers having dry film thicknesses within the ranges specified above improve the adhesion between the PAI layer and the steel substrate and provide active corrosion protection to reduce the formation of red and/or white rust if the PAI layer is damaged. The use of thinner coatings has an associated cost advantage and is therefore desired. A nano-layer thickness between 60 and 100 nm is particularly advantageous in terms of coating adhesion, corrosion resistance and cost.

Advantageously when the corrosion protective coating is provided on a galvanised steel substrate the nanoparticles of the nano-layer react with zinc corrosion products to form a corrosion resistant insoluble precipitate. In the case of silicon nano-particles, it is believed that an insoluble zinc silicate and/or zinc dislicate is formed which improves the corrosion resistance of the corrosion protective coating.

In a preferred embodiment of the invention the coated steel substrate has a coefficient of friction (CoF) between 0.13 and 0.25, preferably between 0.13 and 0.2 at a temperature between −10 and 120° C. Automotive manufactures specify that CoF values should be at least 0.13 and up to 0.25 The coated steel substrates according to the invention comply with such standards. More importantly, the difference in CoF between a first tool pass and a last tool pass of the linear friction test is less than 0.2, preferably less than 0.1 and more preferably less than 0.05. i.e. the CoF is substantially constant. The PAI layer provides lubrication properties to the steel substrate which means an additional step of providing a lubricant in the form of an oil, wax or hard particles during subsequent forming and/or stamping operations is not required. A tool pass may be defined as the number of times a coated strip is drawn between a flat tool and a cylindrical tool of the linear friction test apparatus.

In a preferred embodiment of the invention the oxide-nanoparticles comprise $SiO_2$, $TiO_2$, $Al_2O_3$, $CeO_2$, ZnO, CaO or mixtures thereof. The use of such hydrophilic and/or hydrophobic oxide-nanoparticles reduces the formation of red and/or white rust when the PAI layer becomes damaged.

In a preferred embodiment of the invention the corrosion protective coating comprises a silane nanolayer. Such a nanolayer exhibits very good adhesion to the steel substrate and the polyamide-imide layer.

In a preferred embodiment of the invention the oxide-nanoparticles have a particle size between 10 and 500 nm, preferably between, 10 and 100 nm and more preferably between 10 and 20 nm. The size of the oxide nanoparticles largely determines the thickness of the nano-layer. The use of smaller oxide-nanoparticles is desirable since thinner nano-layers can be obtained. If oxide-nanoparticles having a particle size greater than 500 nm are used then the nano-layer will be brittle and unsuitable for use in subsequent forming steps such as stamping, whereas nano-layers comprising oxide-nanoparticles having a particle size below 10 nm are less effective in preventing the formation of red and/or white rust. A nano-layer thickness between 60 and 100 nm has proven particularly effective in preventing the formation of red and white rust as well as being flexible enough to withstand subsequent forming operations.

In a preferred embodiment of the invention the polyamide-imide layer comprises oxide nano-particles. In addition to providing improved lubrication properties and barrier properties, i.e. against humidity and chemical corrosion, the PAI layer comprising oxide-nanoparticles is also able to provide active corrosion protection to further reduce the effects of corrosion caused by surface defects, scratches and/or cut edges. Preferably the oxide-nanoparticles are the same as those used to form the nano-layer.

In a preferred embodiment of the invention the steel substrate comprises a zinc or a zinc alloy corrosion protective coating, preferably the zinc alloy comprises Zn as the main constituent, i.e. the alloy comprises more than 50% zinc, and one or more of Mg, Al, Si, Mn, Cu, Fe and Cr. Zinc alloys selected from the group consisting of Zn—Mg, Zn—Mn, Zn—Fe, Zn—Al, Zn—Cu, Zn—Cr, Zn—Mg—Al and Zn—Mg—Al—Si are preferred and afford additional corrosion protection to the underlying steel substrate by sacrificial protection and/or by zinc corrosion products reacting with oxide nanoparticles of the nano-layer to form insoluble precipitates. The zinc or zinc alloy coating can be applied by hot-dip galvanising, electro-galvanising, galvannealing or by physical vapour deposition (PVD) and is a suitable substrate onto which the nano-layer can be applied.

Preferably the steel substrate comprises a strip, sheet or blank. Preferably the steel comprises a cold-rolled steel. The inventors found that very good adhesion exists between the nano-layer and such cold rolled steel substrates.

In a preferred embodiment of the invention the steel substrate comprises carbon steel, low carbon steel, high strength steel, advanced high strength steel, boron steel, nickel chromium steel, electrical steel, tin-plated steel, nickel-plated steel and electro-coated chromium steel.

The second aspect of the invention relates to a method of manufacturing a steel substrate comprising a corrosion protective coating according to the first aspect of the invention, which comprises the steps of:
(a) providing a steel substrate;
(b) providing a first curable coating on the steel substrate, which first curable coating comprises water, an organic binder and oxide-nanoparticles;
(c) providing a second curable coating on the first curable coating, which second curable coating comprises water, polyamide-amic acid and an amine;
(d) subjecting the coated steel substrate to at least one curing treatment to form a nano-layer of oxide-nanoparticles and a polyamide-imide layer.

Preferably the amine comprises a hydroxyl amine such as diethylaminoethanol, diisopropanolamine or aminoethylpropanediol.

The steel substrate is coated with the first curable coating by means of roller coating, dip coating, spraying or by using a chemcoater. It is preferred that the first curable coating is aqueous although water/organic solvent (water based) mixtures can be used. Formation of a nano-layer comprising the oxide-nanoparticles can be achieved by curing the first curable coating between 40 and 80° C., preferably between 50 and 60° C. This may be effected by thermal curing in a convection oven or by infrared curing. However, if the steel substrate is provided with a zinc or zinc alloy coating, for instance by hot-dip galvanising, then it is possible and preferred to utilise the heat of the hot-dip galvanised steel substrate to cure the first curable coating.

In one embodiment the first curable coating is cured to form the nano-layer before the second curable coating is provided. The second curable coating may be applied using traditional coil coating processes that include roller coating, dipping, and airless spraying. The polyamide-imide layer is formed by curing the second curable coating between 180 and 270° C., preferably between 180 and 220° C. Coated steel substrates manufactured in this way comprise a corrosion protective coating wherein the nano-layer and the PAI layer exist as two distinct layers.

In a preferred embodiment of the invention the curing treatment causes oxide nano-particles of the first curable coating to diffuse into the second curable coating such that when then first curable coating and the second curable coating are cured, the corrosion protective coating comprises the nano-layer and a polyamide-imide layer comprising oxide-nanoparticles. In this embodiment both the nano-layer and the PAI layer are formed during the same curing treatment, which allows a proportion of the oxide-nanoparticles to diffuse into the second curable coating. In addition to providing improved lubrication properties and barrier properties, i.e. against humidity and chemical corrosion, the cured second curable coating (PAI layer) comprising oxide-nanoparticles is also able to provide active corrosion protection to further reduce the effects of corrosion caused by surface defects, scratches and/or cut edges.

In a preferred embodiment of the invention the organic binder of the nano-layer comprises polyols, polyacrylates or polyamines. The role of the organic binder is to assist in the formation of the nano-layer, which itself comprises a self assembled monolayer of oxide nano-particles. The organic binder 'holds' the oxide-nanoparticles in place thereby reducing the energy that is required to form the monolayer. The inventors found that the organic binders used in accordance with the invention are particularly suitable for that purpose.

In a preferred embodiment of the invention the concentration of the oxide-nanoparticles in the first curable coating is no greater than 10 wt %, preferably between 0.1 and 1 wt %. An oxide-nanoparticle concentration of at least 0.1 wt % is required to form the nano-layer, whereas concentrations in excess of 10 wt % result in the formation of multilayers instead of mono-layers, which increases the dry film thickness of the nano-layer. Oxide-nanoparticle concentrations between 0.1 and 1 wt % result in nano-layers having the best combination of physical and anti-corrosion properties.

In a preferred embodiment of the invention the second curable coating comprises up to 20%, preferably 5 to 20% polyamide-amic acid, up to 7%, preferably 1 to 7% amine and the remainder being water. PAI layers having excellent humidity barrier, corrosion resistance and lubrication properties can be prepared by providing second curable coatings comprising 5 to 20% polyamide-amic acid. The role of the amine is to aid the dissolution of the polyamide-amic acid in water by neutralising the amic acid groups and forming the corresponding water soluble salt. Amines used in accordance with the invention include ammonia, hydroxyl amines such as 2,2-Butyliminodiethanol and tertiary amines such as trimethylamine, N,N-dimethyl ethylamine, N,N-dimethyl propylamine, triethylamine or the like. Surprisingly, the use of hydroxyl amines resulted in much improved coating performance which may be due to the water solubility or hydrogen bonding properties of hydroxyl amines. The rate of curing of the polyamide-amic acid can be enhanced by using tertiary amines. An amine concentration between 1 and 7 wt % is particularly suitable for the purposes of aiding dissolution and increasing the rate of curing. Preferred tertiary amines include trimethylamine, N,N-dimethylethylamine, N,N-dimethylpropylamine, triethylamine or the like.

Use of the coated steel substrate according to the first aspect of the invention in forming operations to form a part, preferably wherein the forming is carried out without lubricant. Such forming operations include blanking, drawing, roll forming and cold rolling. Advantageously the use of the coated steel substrate reduces manufacturing costs since additional lubrication is not required when forming the coated steel substrate. The coated steel substrate can also be manufactured in-house at the steel substrate supplier. This has a significant advantage for the automotive manufacturer since the number of manufacturing steps required to form the part is reduced. At present the automotive manufacturer has to apply lubricant on the steel substrate it has received, form it, clean it to remove the lubricant, provide a phosphate layer on the formed and cleaned steel substrate and provide an electro-coating on the phosphate layer before subsequent paint layers can be applied. The present invention avoids the automotive manufacturer having to provide lubrication, the phosphate layer and the electro-coating.

EXAMPLES

The present invention will be elucidated by referring to the non-limitative examples below:

Example 1

Preparation of an Aqueous Oxide-Nanoparticle Solution

To a reaction vessel equipped with a mechanical stirrer deionised water, 1 wt % $SiO_2$ and 1 wt % polyamine are added This stirred solution is then adjusted to an acidic pH (1-5) with acid.

Example 2

Preparation of Aqueous Polyamide-Amic Acid Solution 200 g of polyamide amic acid (TORLON® AI-50 from Solvay Advanced Polymers, available as wet powder with a solids content of 35 wt %, is dispersed in a mixture of water (485 g) and dimethyl ethanol amine (50 g). The dispersion is then warmed to a temperature between 60 and 70° C. until the solids dissolve to produce a brown aqueous solution having about 9% by weight polyamide-amic acid.

Example 3

Coating (I)

A degreased and cleaned galvanised steel strip having a moving strip speed between 200 and 280 m/min is immersed in the aqueous oxide-nanoparticle solution of example 1. The applied aqueous oxide-nanoparticle solution is then cured at 60° C. for 2-4 seconds using thermal curing to remove the aqueous solvent and the polyamine binder to leave behind a monolayer of $SiO_2$ nanoparticles at the galvanised steel strip surface.

Example 4

Coating (II)

The aqueous polyamide-amic acid solution of example 2 is cooled to room temperature and 0.5 wt % of wetting agent BYK® 380N (from Byk Chemie) is added thereto. This solution is applied on the galvanised steel strip with $SiO_2$-nano-layer by roll coating at a speed of 150-250 m/min. The applied aqueous polyamide-amic acid solution is then cured via near-infrared at 260° C. for 5-10 s.

Example 5

Coating (III)

A degreased and cleaned galvanised steel strip having a moving strip speed between 200 and 280 m/min is immersed in the aqueous oxide-nanoparticle solution of example 1. The applied aqueous oxide-nanoparticle solution is not cured. The aqueous polyamide-amic acid solution of example 2 is cooled to room temperature and 0.5 wt % of wetting agent BYK® 380N (from Byk Chemie) is added thereto. This solution is applied on the galvanised steel strip with the uncured aqueous oxide-nanoparticle solution thereon in a wet-on wet application by roll coating at a speed of 150-250 m/min. The applied aqueous oxide-nanoparticle solution and the applied polyamide-amic acid solution are then cured simultaneously for 5-10 seconds at a temperature of 260° C. using near infrared radiation.

Experiments

In the experiments hereunder a layer of polyamide-imide has been applied on a galvanised steel strip with oxide ($SiO_2$) nano-layer in accordance with Example 4 (E1). The invention embodied by (E1) has been compared to a galvanised steel strip provided with the corresponding polyamide-imide of example 2 (E2) as well as a number of commercial coating systems that are used in the automotive industry to reduce the effects of corrosion caused by surface defects, scratches and cut edges. C1-C3 are comparative examples in which galvanised steel strips have been provided with titanium phosphate (C1), a layer of acrylic paint and a layer of chromate (Cr 3+) thereon (C2) and polyester paint (C3).

Experiment 1

Salt Spray Test

In order to evaluate the performance of E1 in respect of corrosion resistance the coated steel strips of the invention were subjected to a salt spray test. The salt spray test was performed according to ASTM B117, using a 5% NaCl solution at 35° C., with an overpressure of 2-3.5 mbar (200 to 350 Pascal) to create fog inside the spray chamber.

Table 1 shows the corrosion resistance properties of a galvanised steel strip provided with an oxide nano-layer and a polyamide-imide layer (E1), a layer of polyamide-imide (E2) and comparative examples C1-C3. All thicknesses relate to the thickness of the respective layers described above, i.e. exclusive of the underlying galvanised coating layer. With respect to E1 the combined thickness of the nano-layer and the PAI layer is 3 μm with the nano-layer itself having a thickness of 60 nm.

TABLE 1

|  | Thickness (μm) | White rust percentage (Wr %) | | | | |
| --- | --- | --- | --- | --- | --- | --- |
|  |  | 5 days | 10 days | 15 days | 20 days | 25 days |
| E1 | 3 | 0 | 0 | 0 | 1 | 3 |
| E2 | 6 | 0 | 0 | 2 | 3 | 5 |
| C1 | 4 | 5 | 15 | 26 | 60 | 87 |
| C2 | 4 | 10 | 18 | 40 | 75 | 96 |
| C3 | 14 | 0 | 5 | 18 | 26 | 40 |

It can be seen from Table 1 that the present invention E1 offers a significant improvement in corrosion resistance relative to C1-C3 with just 1% white rust being observed after 20 days and 3% white rust being observed after 25 days. E2 also exhibits improved corrosion resistance relative to comparative examples C1-C3 but to a lesser extent when compared to E1, which also has a reduced layer thickness vis-à-vis E2.

The corrosion resistance of the silica nano-layer, i.e. without PAI layer was also assessed. After two days, 30% white rust was observed on the surface of the coated galvanised steel strip. After 20 days, this value had increased to 80%.

Experiment 2

Cyclic Humidity Test

In order to evaluate the performance of E1 in respect of its humidity barrier properties the coated steel strip was subjected to a cyclic humidity test (DIN-norm 50017, ISO6270-2) The following conditions were used: 38° C. with a humidity cycle of 100% for 8 hours and atmospheric humidity for 16 hours.

Table 2 shows the humidity barrier properties of E1, E2 and comparative examples C1-C3. The results show that no white rust forms when the coated steel strip (E1) is subjected to the cyclic humidity test for a period of 15 weeks. Similar results can be seen for the coated steel strip (E2) without nano-layer where 2% white rust was observed over the same period. It is clear that both E1 and E2 exhibit improved humidity barrier performance relative to C1-C3, but the combination of the oxide nano-layer and the polyamide-imide layer is particularly effective as a humidity barrier.

TABLE 2

|  | Thickness (μm) | White rust percentage (Wr %) | | | | |
| --- | --- | --- | --- | --- | --- | --- |
|  |  | 3 wks | 6 wks | 9 wks | 12 wks | 15 wks |
| E1 | 3 | 0 | 0 | 0 | 0 | 0 |
| E2 | 6 | 0 | 0 | 0 | 1 | 2 |
| C1 | 4 | 1 | 4 | 18 | 60 | 87 |
| C2 | 4 | 40 | 80 | 90 | 100 | 100 |
| C3 | 14 | 5 | 13 | 20 | 27 | 49 |

Experiment 3

Linear Friction Test (LFT)

In order to probe the susceptibility of the combined oxide nano-layer and layer of polyamide-imide to galling, E1, E2 and the comparative examples (C1-C3) were subjected to a linear friction test.

Steel strips having a width of 50 mm and a length of 300 mm were, where appropriate (Strip E), oiled with Quaker N6130 oil. The oil layer has a thickness of 1.0±0.2 g/m$^2$, which corresponds to what is usual in a press line. Coated strips A-D were tested without oil to assess their self-lubricating properties. The coated steel strips were then pulled at a speed of 0.33 mm/s between a flat tool and a cylindrical tool pushed together with a force of 5 kN. The tool material used was DIN 1.3343 and the surface roughness (Ra) of each tool was 0.4 μm. Before each test the tools were cleaned with a tissue soaked in acetone or alcohol. The coated strips were drawn through the tools ten times along a testing distance of 55 mm; after each stroke the tools were released and the strips returned to the original starting position in preparation for the next stroke. All tests were conducted in triplicate at 20° C. and 80° C. at atmospheric pressure.

FIG. 1 shows the coefficient of friction as a function of the number of tooling steps (20° C.). Strip A is a hot-dip galvanised steel strip with an oxide nano-layer and a layer of polyamide-imide thereon (E1). The combined thickness of the oxide-nanolayer and the layer of polyamide-imide is 3 μm. Strip B is a hot-dip galvanised steel strip that has been provided with a layer of PAI having a thickness of 6 μm. Strip C corresponds to steel strip C1, strip D corresponds to steel strip C2 and strip E is a hot-dip galvanised steel strip that has been provided with oil as a lubricant.

From FIG. 1 it can be seen that the coefficient of friction is substantially constant for both Strip A and Strip B, i.e. the difference in friction coefficient between the first tool pass and the last tool pass is less than 0.05. Moreover, the layer of polyamide-imide is smooth enough to have a friction coefficient that satisfies the CoF requirements of the automotive industry (0.13-2.5). The presence of the oxide-nanolayer does not significantly influence the friction coefficient. The results also show that the combination of the oxide nano-layer and the polyamide-imide layer of strip A results in excellent adhesion to the underlying galvanised steel strip. The polyamide-imide layer itself also exhibited excellent adhesion to the galvanised steel strip as evidenced by the results relating to strip B. If this was not the case then the friction coefficient would increase with the number of tool passes. During the LFT no tool damage or tool fouling was observed. The layer of polyamide-imide is also hard enough to resist contact with a metallic tool (at least 10 times). It is this combination of surface characteristics (hard, smooth and adhesive) that allows the coated steel strips of the present invention to be formed or stamped without the need of additional lubrication (oil, wax, hard particles). For experiments carried out at 80° C. strip A and strip B exhibited a coefficient of friction within the range specified by the automotive manufacturer, i.e. between 0.13 and 0.25. Moreover, the CoF remained substantially constant within the aforementioned range. In contrast, strip E, corresponding to a hot-dip galvanised strip provided with Quaker N6130 oil, exhibited an increase in CoF of more than 0.2 between pass 1 and pass 10.

Experiment 4

Adhesion Test

Coating adhesion was assessed in accordance with ASTM D 3359-08, which comprises the steps of applying and removing pressure-sensitive tape over cuts made in the coating. This standard test was carried out on a galvanised steel strip provided with an oxide nano-layer and a polyamide-imide layer (E1), and a galvanised steel strip provided with a phosphate layer and an electro-(organic)-coating on the phosphate layer (C4). Adhesion properties were assessed by measuring the percentage of coating that delaminates from the coated surface after removal of the pressure-sensitive tape. The test results showed that 0% (5B rating) of the corrosion protective coating (E1) delaminated from the galvanised steel strip surface, whereas 35% (2B rating) delamination was observed for the phosphate/E-coat system (C4).

The invention claimed is:

1. A steel substrate suitable for forming operations comprising:
    the substrate in the form of a strip, sheet or blank, the substrate being of steel or steel having a zinc or zinc-alloy coating,
    a corrosion protective coating directly over the substrate, wherein the corrosion protective coating comprises
        a first intermediate nano-layer of oxide nanoparticles, and
        a second top layer of polyamide-imide directly over the nano-layer,
    wherein the oxide-nanoparticles have a particle size between 60 and 100 nm, and the first intermediate nano-layer consists of the oxide nanoparticles and a binder selected from at least one member of the group consisting of polyols, polyacrylates, and polyamines.

2. The steel substrate according to claim 1, wherein the polyamide-imide layer comprises a hydroxyl amine.

3. The steel substrate according to claim 1, wherein the polyamide-imide layer has a coating thickness between 1 and 10 μm.

4. The steel substrate according to claim 1, having a coefficient of friction between 0.13 and 0.25 at a temperature between −10 and 120° C.

5. The steel substrate according to claim 1, wherein the oxide-nanoparticles comprise SiO2, TiO2, ZrO2, CaO or mixtures thereof.

6. The steel substrate according to claim 1, wherein the corrosion protective coating comprises a silane nanolayer.

7. The steel substrate according to claim 1, wherein the layer of polyamide-imide comprises oxide-nanoparticles.

8. The steel substrate according to claim 1, wherein the steel substrate comprises a zinc or a zinc alloy corrosion protective coating.

9. The steel substrate according to claim 8, wherein the steel substrate comprises the zinc or zinc alloy corrosion protective coating, wherein zinc alloy of the zinc alloy corrosion protective coating comprises more than 50% zinc and one or more of Mg, Al, Si, Mn, Cu, Fe and Cr.

10. The steel substrate according to claim 1, wherein the steel substrate comprises the strip, sheet or blank and the forming operations include at least one member of the group consisting of blanking, drawing, roll forming, and cold rolling.

11. The steel substrate according to claim 1, wherein the steel comprises a cold-rolled steel.

12. The steel substrate according to claim 1, wherein the steel substrate comprises carbon steel, low carbon steel, high strength steel, advanced high strength steel, boron steel, nickel chromium steel, electrical steel, tin-plated steel, nickel-plated steel and electro-coated chromium steel and the steel substrate is in the form of the blank.

13. A method of manufacturing the steel substrate of claim 1, comprising the corrosion protective coating, which comprises the steps of:
    (a) providing the steel substrate;
    (b) providing a first curable coating on the steel substrate, which first curable coating comprises water, the binder and the oxide-nanoparticles;
    (c) providing a second curable coating on the first curable coating, which second curable coating comprises water, polyamide-amic acid and an amine;
    (d) subjecting the coated steel substrate to at least one curing treatment to form the first intermediate nano-layer of oxide-nanoparticles and the second top layer of polyamide-imide.

14. The method according to claim 13, wherein the amine comprises a hydroxyl amine.

15. The method according to claim 14, wherein the hydroxyl amine comprises at least one member selected from the group consisting of diethylaminoethanol, diisopropanolamine and aminoethylpropanediol.

16. The method according to claim 14, wherein the hydroxyl amine has a boiling point of at least 160° C.

17. The method according to claim 14, wherein the hydroxyl amine has a boiling point of at least 240° C.

18. The method according to claim 13, wherein the curing treatment causes the oxide nano-particles of the first curable coating to diffuse into the second curable coating such that when the first curable coating and the second curable coating are cured, the corrosion protective coating comprises the nano-layer and the polyamide-imide layer comprising oxide-nanoparticles.

19. The method according to claim 13, wherein the concentration of the oxide nanoparticles in the first curable coating is no greater than 10 wt %.

20. The method according to claim 13, wherein the second curable coating comprises up to 20% polyamide-amic acid, up to 7% amine, and the remainder being water.

21. The method according to claim 13, wherein the concentration of the oxide nanoparticles in the first curable coating is between 0.1 and 1 wt %.

22. A method comprising forming the steel substrate of claim 1.

23. The steel substrate according to claim 1, wherein the forming is carried out without lubricant, wherein the polyamide-imide layer has a coating thickness between 3 and 5 μm.

24. The steel substrate according to claim 1, having a coefficient of friction between 0.13 and 0.2 at a temperature between −10 and 120° C.

* * * * *